March 25, 1930.  H. W. NIEMAN  1,751,651
THRUST BEARING
Filed June 1, 1927
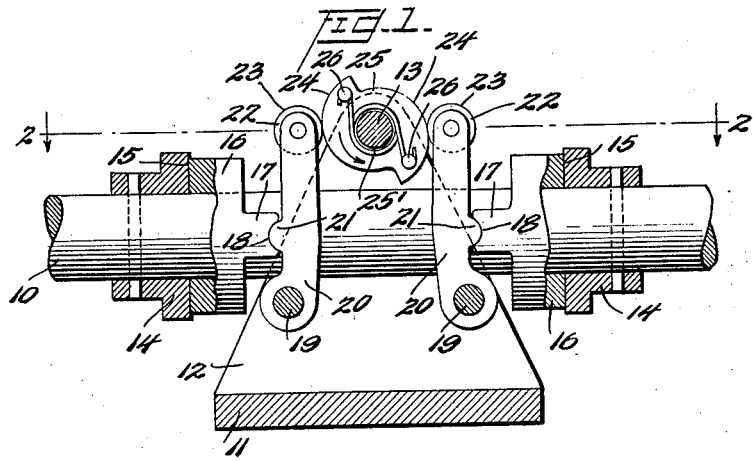
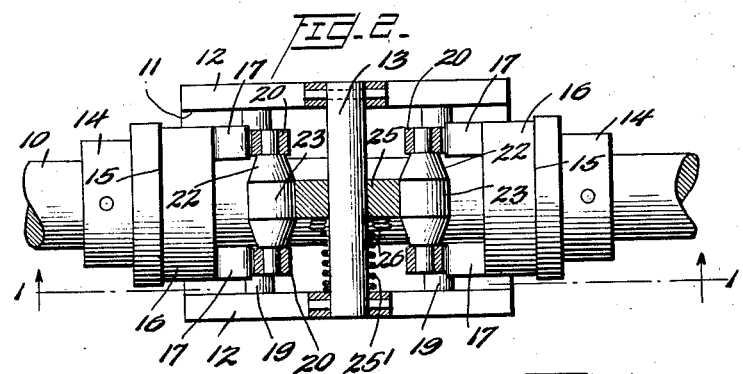
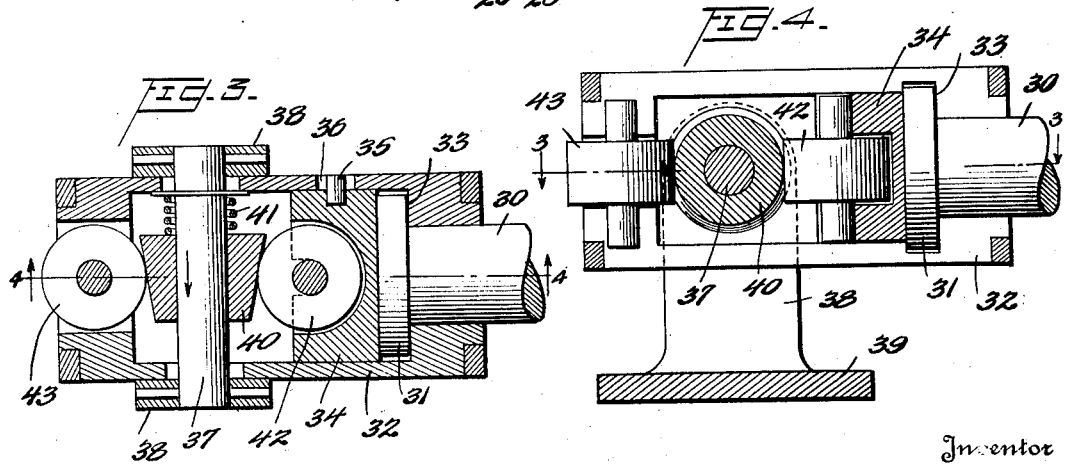
Inventor
Henry W. Nieman,
By Watson, Coit, Morse & Grindle
Attorney Patented Mar. 25, 1930

1,751,651

UNITED STATES PATENT OFFICE

HENRY W. NIEMAN, OF BETHLEHEM, PENNSYLVANIA

THRUST BEARING

Application filed June 1, 1927. Serial No. 195,812.

The present invention relates to thrust bearings and particularly to bearings for preventing end play of rods or shafts.

Many types of machines differing widely in structure and purpose include as operating elements horizontally disposed rotating shafts. With respect to certain of these shafts a small amount of end play is of little or no importance, the functioning of the machine in its entirety not being affected one way or the other by such slight longitudinal movements. On the other hand, in many types of machines there are one or more horizontally disposed shafts which carry such parts, or are so disposed relatively to other operating parts, that it is highly important to keep them from longitudinal or axial movement, even to the slightest degree. Many attempts have been heretofore made to provide a means for preventing shaft end play, but it may be generally stated that prior to the present invention no means of this character has been provided, which not only prevented shaft end play when initially installed but which also continued to effectively prevent such end play throughout the life of the shaft or its bearings.

According to the present invention a thrust bearing construction is provided by means of which end play of a horizontal shaft is entirely eliminated, not only during the period immediately after the shaft is first mounted and before wear occurs, but at all times during the life of the shaft. It is entirely automatic in its nature and, as wear occurs between the thrust bearing and shaft, this wear is automatically compensated for. As the result of its novel functioning all hand or manual adjustment is done away with and when once installed the novel thrust bearing needs no further attention.

In the accompanying drawings two embodiments of the invention are illustrated, the first embodiment comprising a thrust bearing designed and constructed to be placed along a shaft at any point intermediate its ends, and the second embodiment comprising a thrust bearing for the end of the shaft. In the drawings:

Fig. 1 is a section on line 1—1 of Fig. 2;

Fig. 2 is a section on line 2—2 of Fig. 1, Figs. 1 and 2 being two views of a thrust bearing of the type which is to be applied intermediate the shaft ends;

Fig. 3 is a section on line 3—3 of Fig. 4; and

Fig. 4 is a section on line 4—4 of Fig. 3, the last two views being of a thrust bearing for use at the end of a shaft.

Referring first to that form of thrust bearing adapted to be used intermediate the shaft ends. The shaft itself is indicated at 10 and in this instance is circular in cross section. A bracket is indicated at 11 and the base plate of this bracket may be secured in any suitable manner to a stationary portion of the machine in which the shaft 10 is incorporated, or, in the event that the thrust bearing is applied to line shafting, the bracket may be secured to any suitable stationary member which is available. The shaft 10 extends between upwardly extending flanges 12 of the bracket and lies beneath a cross shaft or spindle 13 which has its ends rigidly mounted in these flanges.

Fixed on shaft 10 are collars 14 which have mutually facing annular friction surfaces 15. Bearing against these collars and loosely mounted upon the shaft are thrust shoes 16, each shoe having two diametrically opposed lugs 17 projecting parallel to the axis of shaft 10 and hollowed out at their ends as at 18. Pivotally supported upon stub shafts or spindles 19, which have their ends mounted in the flanges 12 and which are disposed parallel to shaft 13, are four rocker arms 20, these rocker arms being arranged in pairs on the respective shafts and each having a rounded lug or enlargement 21 which fits within the hollowed out or recessed end portion of the corresponding lug 17. Journalled in suitable cylindrical apertures in the upper ends of the pairs of rockers, are rollers 22 having cylindrical bearing surfaces 23, which bear respectively against the involute faces 24 of a movable part 25 which is rotatably mounted upon shaft 13. A coiled spring 25' which has its intermediate portion secured to the adjacent flange 12 and its end portions secured to the movable part 25 at points 26, 26, normally tends to rotate part 25 in the direction of the arrow (Fig. 1) so that this part, due to the camming action of the involute faces 24, 24, tends to separate rollers 23 and to force by the lever action of rockers 20, the thrust shoes 16 into close contact with the thrust collars 14.

The movable part 25 is so designed and constructed that a thrust of one roller against its surface, due to an unbalanced force acting in one direction on the shaft 10, merely causes frictional binding of this member on its supporting shaft or spindle 13 without resulting in rotation against the action of spring 25'. For such unbalanced force or thrust, therefore, it constitutes a non-yielding abutment and it is immaterial from which direction (right or left) the thrust comes. It will be apparent that any force exerted on shaft 10 and tending to move it lengthwise will cause one of the fixed thrust collars 14 to bear on the corresponding thrust shoe 16 and that this thrust is conveyed to part 25 through the action of the corresponding lever 20.

If the shaft is rotatable, collars 14 of course move with it, while thrust shoes 16 remain stationary. To minimize wear between the collars 14 and shoes 16, their mutually abutting faces may be lined with any suitable anti-friction material. When wear occurs, however, the light spring 25', acting through the double cam 25, effects further separation of rollers 23 and the wear is immediately taken up, the rollers coming to rest against new elements of the involute surfaces 24. In the event that there is any expansion of shoes 16 or any tendency from whatever cause, for rollers 23 to be brought more closely together simultaneously, this binding or pressure is relieved by the part 25 which rotates against the action of spring 26 until the pressure is relieved. This counter-rotation of part 25 when both rollers 23 are active, is instantaneous and frictionless, part 25 being so designed that it is readily rotatable by simultaneous action of the rollers in pressing against it, although, as previously explained, it presents a non-yielding abutment when one roller only is active.

In the form of the invention shown in Figs. 3 and 4, a rotatable shaft 30 is provided at one end with a collar 31 which is in reality a thrust collar. The end of the shaft lies within a cylindrical member 32, the annular inner end surface 33 of this member bearing against the annular face of thrust collar 31. A cylindrical thrust shoe 34 fits closely within the hollowed out interior of the cylindrical member 32 and the circular forward face of this shoe bears against the end face of the shaft. A pin 35 which extends laterally from shoe 34 projects into a slot 36 formed in the cylinder 32 and by this means shoe 34 is prevented from rotating relatively to the cylinder, although obviously it may have a slight longitudinal movement therein.

Rearwardly of shoe 34 cylinder 32 is provided with diametrically opposed circular apertures to receive a horizontal shaft 37 the ends of which are rigidly supported in the spaced upright arms 38 of a pedestal, the base 39 of which is firmly secured to some stationary portion of the machine in which the shaft is embodied, or other stationary member in the event that the shaft end is remote from a machine. Slidably mounted on shaft 37 is a wedge-like member 40 normally pressed by a spring 41 in the direction of the arrow (Fig. 3). The inclined faces of the wedge bear respectively against rollers 42 and 43, the former of which is rotatably carried in the thrust shoe 34 and the latter of which is rotatably carried in the end of the cylinder 32.

From the foregoing it is obvious that the action of spring 41 is, through rollers 42 and 43, effective in tending to move thrust shoe 34 and cylinder 32 in opposite directions with equal force. This of course brings the bearing surfaces of these members into close contact with the trust surfaces of thrust member or collar 31 of shaft 30. Assuming that a force is impressed upon shaft 30 which tends to move it to the left (Fig. 3) it is apparent that roller 42 will be caused to exert a considerable pressure upon the wedge 40. As a result of this pressure, however, no movement of the wedge occurs, as it simply binds frictionally on shaft 37 and comprises a non-yielding abutment. Any force impressed on shaft 30 which tends to move it to the right (Fig. 3) tends also to draw the cylinder 32 to the right and hence causes roller 43 to bear on the opposite side of the wedge. As before, no sliding of the wedge occurs as it also constitutes a non-yielding abutment when acted on in this direction. There is therefore no possibilty of endwise movement of the shaft occurring.

Long continued rotation of shaft 30, however, will ultimately cause wear of the various parts, particularly the mutually engaging friction or thrust surfaces. As such wear occurs it is automatically taken up by the action of the wedge 40 which moves downwardly under the influence of spring 41, drawing cylinder 42 toward the left (Fig. 3) and forcing thrust shoe 34 toward the right. At no time, therefore, can there occur any end play due to wear of the parts, and the life of the thrust bearing is therefore practically unlimited, while at the same time it operates with full efficiency at all stages.

The moving parts 40 and 25 of the two forms of the thrust bearing disclosed may have various forms. In my copending application Serial No. 79,737, filed January 7, 1926, are disclosed a large number of alternative forms of this element and it will be understood that any suitable form may be substituted for those illustrated and described. Likewise, further changes may be made in the design and arrangement of the component elements of the invention in adapting the same to suit various types of shafts, rods, etc., without departing from the spirit of the invention and the scope of the claims.

Having thus described the invention, what is claimed as new and desired to be secured by Letters Patent is:

1. A thrust bearing for a shaft or the like subjected to changing direction of thrust, which prevents axial movement of the shaft in either direction at all times including, in combination with a shaft having oppositely facing thrust surfaces and spaced thrust members having thrust surfaces in contact with the thrust surfaces of the shaft, of a base, and mechanism mounted on the base for maintaining the thrust surfaces of the shaft and thrust members, respectively, in constant engagement, said mechanism including a member movably mounted on the base and having opposed surfaces which bear respectively upon the thrust members, and means urging said member in a direction to cause its opposed surfaces to act simultaneously upon said thrust members respectively, to take up lost motion due to wear when the shaft is for the time being transmitting no substantial thrust, which member also constitutes a non-yielding abutment for that thrust member which is active when the shaft is transmitting a substantial thrust.

2. The combination with a shaft having oppositely facing transverse thrust surfaces, of thrust members bearing against said surfaces, a stationary member and a movable part mounted on said stationary member and cooperating with both of said thrust members, said part normally urging both members simultaneously into close engagement with the corresponding thrust surfaces of the shaft when no substantial amount of thrust is being transmitted, but remaining stationary under the thrust of either of said thrust members alone.

3. The combination set forth in claim 2 in which the transverse thrust surfaces of the shaft are mutually facing and the movable part comprises a double cam member movably supported on a spindle extending transversely of the shaft.

4. The combination set forth in claim 2 in which the movable part acts directly on two levers which bear respectively upon said thrust members.

In testimony whereof I hereunto affix my signature.

HENRY W. NIEMAN.